(12) United States Patent
Townsend et al.

(10) Patent No.: US 10,670,400 B2
(45) Date of Patent: Jun. 2, 2020

(54) VIBRATING STRUCTURE GYROSCOPES

(71) Applicant: Atlantic Inertial Systems Limited, Plymouth, Devon (GB)

(72) Inventors: Kevin Townsend, Liskeard (GB); Andrew Kazer, Taunton (GB)

(73) Assignee: ATLANTIC INERTIAL SYSTEMS, LIMITED, Plymouth, Devon (GB)

( * ) Notice: Subject to any disclaimer, the term of this patent is extended or adjusted under 35 U.S.C. 154(b) by 48 days.

(21) Appl. No.: 16/143,634

(22) Filed: Sep. 27, 2018

(65) Prior Publication Data

US 2019/0145771 A1 May 16, 2019

(30) Foreign Application Priority Data

Nov. 10, 2017 (GB) .................................. 1718641.2

(51) Int. Cl.
*G01C 19/5684* (2012.01)
(52) U.S. Cl.
CPC ................................ *G01C 19/5684* (2013.01)
(58) Field of Classification Search
CPC ................ G01C 19/56; G01C 19/5684; G01C 19/5691; G01P 9/04; G01P 15/08; G01P 15/125
See application file for complete search history.

(56) References Cited

U.S. PATENT DOCUMENTS

| 6,282,958 | B1 | 9/2001 | Fell | |
| 7,444,868 | B2 | 11/2008 | Johnson | |
| 7,526,957 | B2 * | 5/2009 | Watson | G01C 19/56 73/504.13 |
| 7,637,156 | B2 | 12/2009 | Araki et al. | |
| 7,958,781 | B2 * | 6/2011 | Fell | G01C 19/5684 73/504.13 |
| 8,087,295 | B2 | 1/2012 | Netzer | |

(Continued)

FOREIGN PATENT DOCUMENTS

EP 1944574 A1 7/2008
WO 2006006597 A1 1/2006
(Continued)

OTHER PUBLICATIONS

Intellectual Property Office Search Report for International Application No. 1718641.2 dated Apr. 19, 2018, 4 pages.
(Continued)

*Primary Examiner* — Brandi N Hopkins
(74) *Attorney, Agent, or Firm* — Cantor Colburn LLP

(57) ABSTRACT

A vibrating structure gyroscope includes an annular resonator arranged to vibrate in a plane in response to electrostatic driving forces and a set of capacitive drive electrodes arranged to apply a voltage creating an electrostatic driving force to excite a primary cos nθ resonance along a primary axis at a primary frequency $f_P$, such that Coriolis forces, resulting from an angular rate applied about an out-of-plane axis, induce a secondary cos nθ resonance along a secondary axis at a secondary frequency $f_S$. The gyroscope also includes digitally-controlled first and second sets to creating a static electrostatic balancing.

15 Claims, 7 Drawing Sheets

(56) References Cited

U.S. PATENT DOCUMENTS

| | | | |
|---|---|---|---|
| 10,520,331 B2 * | 12/2019 | Weinberg | G01C 25/005 |
| 2003/0000306 A1 * | 1/2003 | Fell | G01C 19/5684 |
| | | | 73/504.12 |
| 2005/0166675 A1 | 8/2005 | Hobbs et al. | |
| 2007/0220972 A1 | 9/2007 | Araki et al. | |
| 2009/0064782 A1 | 3/2009 | Yazdi | |
| 2015/0192415 A1 * | 7/2015 | Ge | G01C 19/5776 |
| | | | 73/504.13 |
| 2018/0231383 A1 * | 8/2018 | Trusov | G01C 19/5691 |
| 2019/0360808 A1 * | 11/2019 | Seshia | G01C 25/00 |

FOREIGN PATENT DOCUMENTS

| | | |
|---|---|---|
| WO | 2013136049 A1 | 9/2013 |
| WO | 2017025752 A1 | 2/2017 |

OTHER PUBLICATIONS

Keymeulen et al., "Tuning of MEMS Gyroscope Using Evolutionary Algorithm and Switched Drive-Angle" Method, Proceeding of the 2006 IEEE Aerospace Conference, Doi: 10.1109/AERO.2006.1655973, 8 pages.

European Search Report for Application No. 18275175.0 dated Apr. 26, 2019, 6 pages.

\* cited by examiner

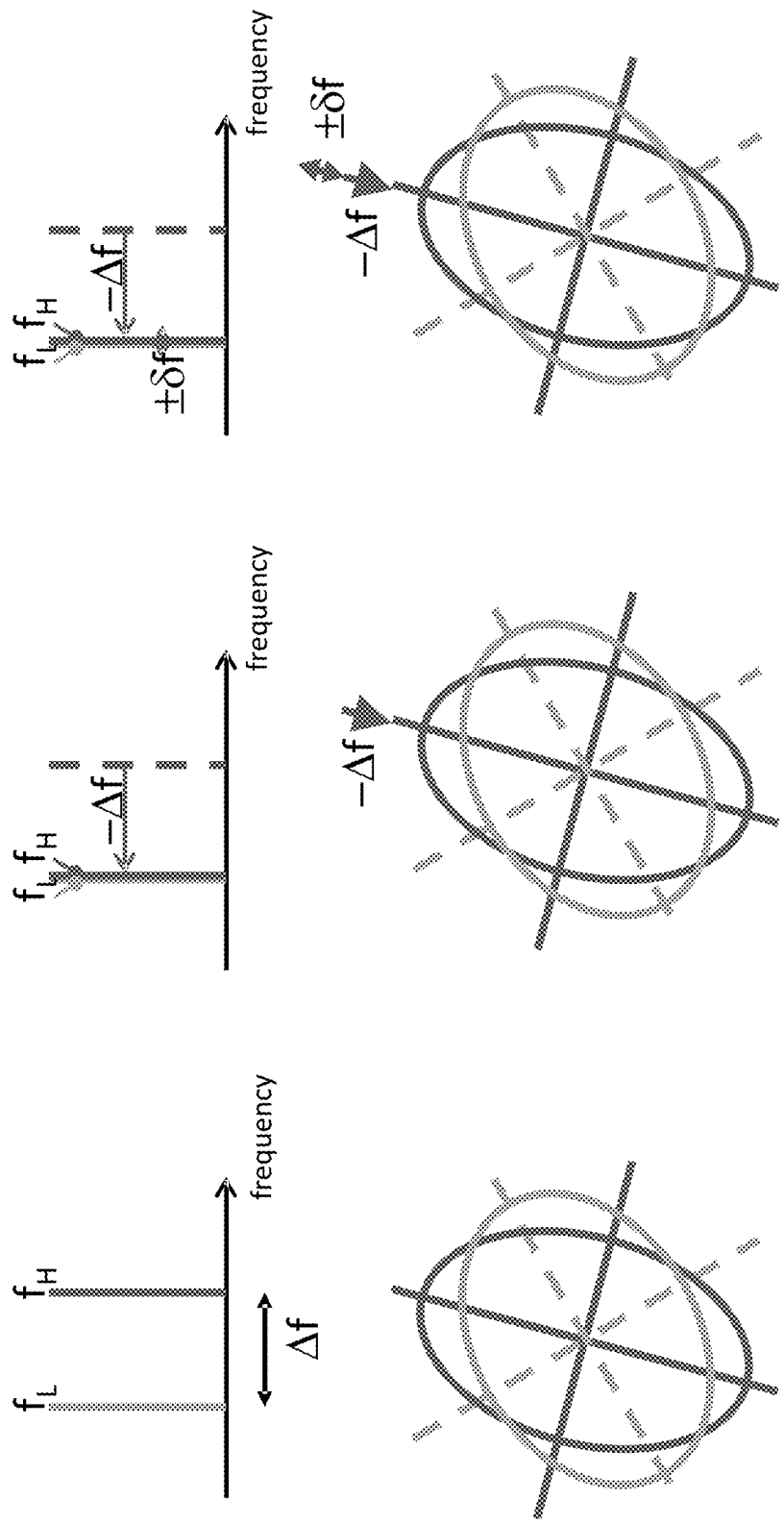

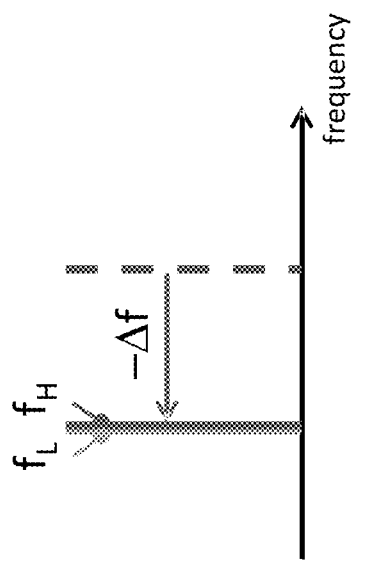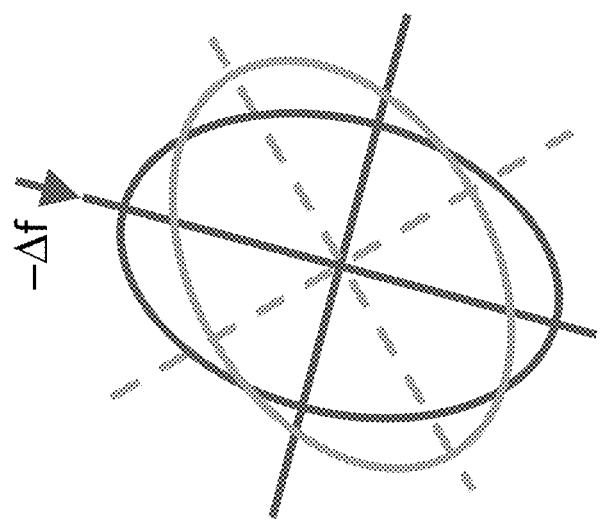
FIG. 4A
FIG. 4B

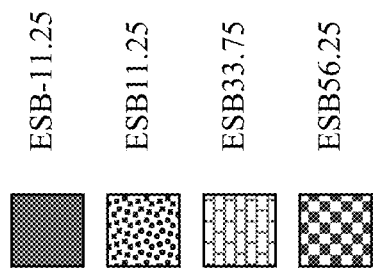
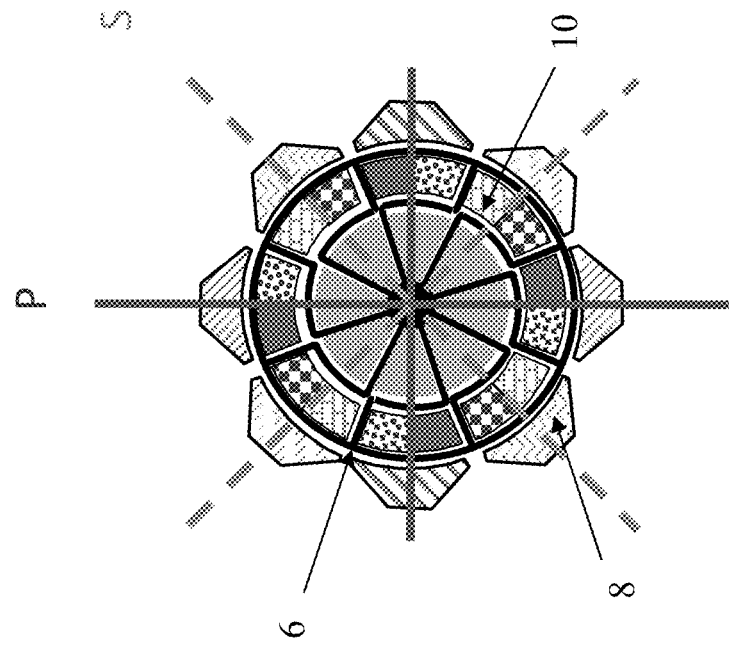
FIG. 5

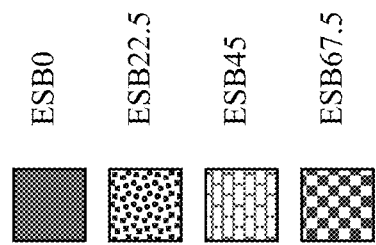
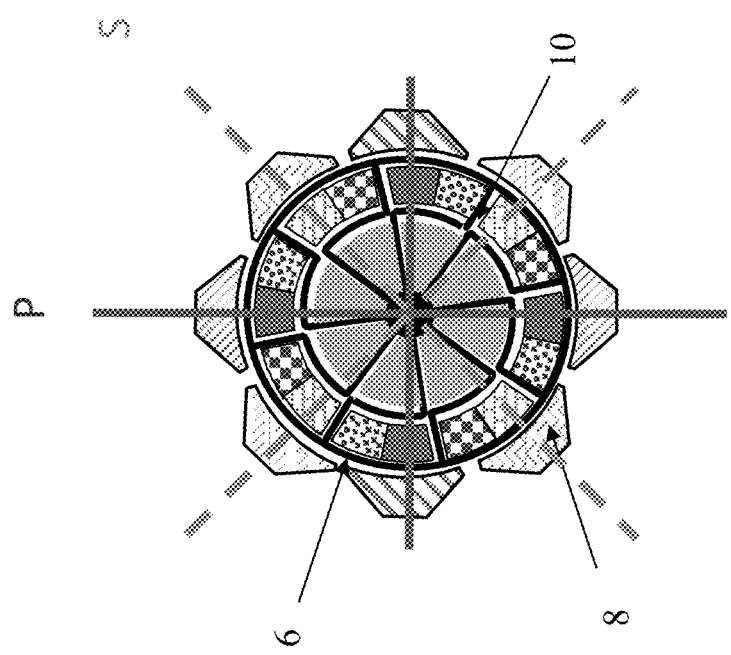
FIG. 6

VIBRATING STRUCTURE GYROSCOPES

FOREIGN PRIORITY

This application claims priority to Great Britain Patent Application No. 1718641.2 filed Nov. 10, 2017, the entire contents of which is incorporated herein by reference.

TECHNICAL FIELD

This disclosure relates to vibrating structure gyroscopes, and particularly, but not exclusively, Coriolis-type gyroscopes.

BACKGROUND

Vibrating structure gyroscopes, fabricated using Micro-Electro-Mechanical Systems (MEMS) technology, are finding use in aerospace applications for guidance and control. A typical Coriolis-type vibrating structure gyroscope comprises an annular resonator supported by compliant legs to vibrate in-plane in response to electrostatic drive signals. The annular resonator can be operated using a cos 2θ vibration pair, e.g. as described in WO 2006/006597. In operation, a drive transducer excites a primary carrier vibration along a primary axis of motion at a nominal resonant frequency e.g. 14 kHz. When the gyroscope is rotated around an axis normal to the plane of the annular resonator, Coriolis forces are generated which couple energy into a secondary response vibration along a secondary axis of motion oriented at 45° to the primary axis. In the theoretical case of a perfectly annular resonator, depicted schematically in FIG. 1, the primary motion is always aligned to the primary axis regardless of the frequency of excitation. The Coriolis-induced secondary response vibration is aligned to the secondary axis at 45° and there is no frequency split.

However, in reality there are geometrical imperfections in the annular shape of the resonator and this means that the primary carrier vibration at a given resonant frequency (e.g. 14 kHz) is a superposition of two orthogonal modes, a high frequency mode (HFM) shifted to a slightly higher frequency $f_H$ and a low frequency mode (LFM) shifted to a slightly lower frequency $f_L$. As imperfections lead to the modes having different frequencies, one is inevitably higher frequency than the other. However the higher mode frequency $f_H$ may or may not be higher than the perfect case where the mode frequencies are the same. The frequency split $\Delta f$ is the difference between the frequencies of the HFM and LFM, i.e. $\Delta f = f_H - f_L$. For a cos 2θ vibration pair, the orthogonal high frequency and low frequency modes are always at 45° to each other but can be at any arbitrary angular position α relative to the primary axis typically used as a reference axis. The value of the angle α will depend on the imperfections in the resonator.

MEMS design and fabrication processes are capable of producing planar silicon ring resonators with fine tolerances in an attempt to minimise any frequency difference between the high frequency and low frequency modes. However, even small imperfections in the geometry of an annular resonator will typically give rise to a residual frequency split.

Performance of MEMS ring gyroscopes can be improved by more accurate balancing of the high frequency and low frequency modes than can be achieved at manufacture. In one approach, the mass or stiffness distribution of the annular resonator is adjusted, for example using laser removal of material post-manufacture. Laser balancing, as described in WO 2013/136049, is typically used as part of the production process for inductive gyroscopes. This gives improved performance but cannot account for any variation during operation and life.

In capacitive gyroscopes, electrostatic balancing schemes typically use a number of balancing electrode plates arranged around the annular resonator so that balancing can be resolved to any position around the ring. An initial, static electrostatic balance correction can be applied to one or more of the plates to locally adjust the stiffness of the annular resonator and compensate for manufacturing tolerances. However it is also known to control the electrostatic balancing voltages during operation. For example, WO 2006/006597 describes sixteen balancing electrode plates used for vibrational frequency adjustment during operation of the gyroscope. Electrostatic balancing applies a local reduction in stiffness which produces a frequency reduction proportional to the square of the voltage difference between the ring and the balancing plate. This means that the high frequency and low frequency modes can be differentially adjusted to try to achieve accurate matching. By applying fixed DC voltages to a group of four of the balancing plates located around the annular resonator, the frequency split $\Delta f$ can be reduced to less than 1 Hz. There is seen in FIG. 2 an example of a 33,000 Q factor gyroscope having a 0.424 Hz split between the frequencies of the HFM and LFM (α=0°).

Although electrostatic balancing has been used with capacitive gyroscopes, the digitally-controlled voltages applied to the balancing plates have discrete analog output values set by the digital-to-analog converter (DAC) and its defined LSB (least significant bit), i.e. the step between successive analog outputs. When using digital means of linearly varying the voltage, the resolution of the balancing effect decreases with increasing applied voltage difference. This is due to the squared nature of balancing, with the frequency split $\Delta f$ being related to the voltage squared. If a dynamic balancing is implemented, combined with a large static balance correction, the available resolution is degraded, which limits the overall gyroscope performance.

There remains a desire to achieve improved electrostatic frequency balancing during operation of a capacitive gyroscope.

SUMMARY

There is disclosed herein a vibrating structure gyroscope comprising:

an annular resonator arranged to vibrate in a plane in response to electrostatic driving forces;

a set of capacitive drive electrodes arranged to apply a voltage creating an electrostatic driving force to excite a primary cos nθ resonance along a primary axis at a primary frequency $f_P$, such that Coriolis forces, resulting from an angular rate applied about an out-of-plane axis, induce a secondary cos nθ resonance along a secondary axis at a secondary frequency $f_S$, wherein the geometry of the annular resonator results in the primary frequency $f_P$ being a superposition of a higher frequency mode $f_H$ and an orthogonal lower frequency mode $f_L$, having a frequency split $\Delta f$ defined as $\Delta f = f_H - f_L$;

a first set of digitally-controlled capacitive balancing electrodes arranged to apply a first static balancing voltage creating a static electrostatic balancing force to lower the frequency $f_H$ below the frequency $f_L$ by a small frequency offset $f_O$ to an offset frequency $f_H'$, i.e. $f_H' = f_H - \Delta f - f_O$; and a second set of digitally-controlled capacitive balancing electrodes arranged to apply a second static balancing voltage creating a small static electrostatic balancing force to lower the frequency $f_L$ by the same small frequency offset $f_O$ to an offset frequency $f_L'$, i.e. $f_L'=f_L-f_O$;

wherein the second set of capacitive balancing electrodes is arranged to dynamically apply a fine balancing voltage creating a dynamic electrostatic balancing force providing a fine frequency adjustment $\pm\delta f$ to lower the offset frequency $f_H'$ so as to maintain $f_H'$ at $f_L'$ during operation.

It will be understood that, in reality, the imperfect geometry of the annular resonator unfortunately results in the primary frequency $f_P$ being a superposition of a higher frequency mode $f_H$ and an orthogonal lower frequency mode $f_L$. The lower frequency mode $f_L$ is mathematically orthogonal i.e. at an anti-node position compared to the node position of the higher frequency mode $f_H$. For a primary cos 2θ resonance there is an angle of 45° between the higher frequency mode $f_H$ and the orthogonal lower frequency mode $f_L$. For a primary cos 3θ resonance there is an angle of 30° between the higher frequency mode $f_H$ and the orthogonal lower frequency mode $f_L$. Of course higher order cos nθ resonances may be excited, the angle between the higher frequency mode $f_H$ and the orthogonal lower frequency mode $f_L$ given by the general rule of 90°/n.

According to this disclosure, the first set of digitally-controlled balancing electrodes applies a first static balancing voltage creating a static electrostatic balancing force to lower the frequency $f_H$ by $(\Delta f+f_O)$. There is therefore an additional frequency offset $f_O$ applied to the higher frequency mode $f_H$ by the first set of balancing electrodes, rather than simply lowering the frequency $f_H$ to match the frequency $f_L$ in an attempt to remove the frequency split $\Delta f$, as was previously known. According to this disclosure, a second set of digitally-controlled balancing electrodes is used to lower the frequency $f_L$ by the same small frequency offset $f_O$. This means that both the higher frequency mode $f_H$ and the lower frequency mode $f_L$ are now shifted by the small frequency offset $f_O$ to a new frequency position to which frequency balancing can be applied. Note that the static balancing to provide $\Delta f$ and $f_O$ is highly non-linear and is very difficult to achieve accurately in the analogue domain. The second set of balancing electrodes is also used to dynamically apply a fine balancing voltage, with a finer frequency adjustment $\pm\delta f$ being achieved, compared to prior art frequency balancing schemes, as this is now being applied about the frequency offset $f_O$. The dynamic fine balancing (carried out in the analogue or digital domain) uses the same second set of electrodes as is used to apply the small frequency offset $f_O$ to the lower frequency mode $f_L$. This ensures that the resolution of the dynamic balancing is improved irrespective of the magnitude of the first static balancing voltage being applied to remove the frequency split $\Delta f$. Such dynamic fine balancing can better counter operational imbalances experienced during normal operation of the gyroscope and over the lifetime of the gyroscope.

In various examples, the second set of capacitive balancing electrodes is arranged to apply a second static balancing voltage that is less than the first static balancing voltage applied by the first set of capacitive balancing electrodes. What is meant by a small frequency offset $f_O$ is that the frequency offset $f_O$ is small compared to the frequency split $\Delta f$. Thus it will be appreciated that, in various examples, $f_O<\Delta f$ and preferably $f_O<<\Delta f$. As the dynamic fine balancing only needs to correct for the range of variation expected during normal operation, the frequency offset $f_O$ can be quite small compared to the frequency split $\Delta f$. In some examples, $f_O$ is chosen as approximately $\Delta f/5$, $\Delta f/6$, $\Delta f/7$, $\Delta f/8$, $\Delta f/9$, $\Delta f/10$ or less than $\Delta f/10$. The smaller the frequency offset $f_O$ the better the resolution. The available range of fine frequency adjustment $\pm\delta f$ is up to a maximum value equal to the frequency offset $f_O$.

In various examples, the second set of digitally-controlled capacitive balancing electrodes is dynamically controlled to dynamically apply the fine balancing voltage creating a dynamic electrostatic balancing force providing the fine frequency adjustment $\pm\delta f$. In some examples, the gyroscope may comprise a digital control circuit connected to the second set of digitally-controlled capacitive balancing electrodes and arranged to dynamically control the second set of capacitive balancing electrodes to apply the fine frequency adjustment $\pm\delta f$. In some examples, the gyroscope may comprise an analogue signal control circuit connected to the second set of digitally-controlled capacitive balancing electrodes and arranged to dynamically control the second set of capacitive balancing to provide the fine frequency adjustment $\pm\delta f$. In various examples, the second set of capacitive balancing electrodes is controlled independently of the first set of capacitive balancing electrodes. For example, the gyroscope may comprise a digital control system arranged to control the second set of digitally-controlled capacitive balancing electrodes independently of the first set of capacitive balancing electrodes. The balancing electrodes of the first and second sets may be physically identical apart from their angular position, as discussed further below.

In one or more examples, the first set of capacitive balancing electrodes comprises four groups of balancing electrodes, the four groups spaced equiangularly around the annular resonator, i.e. at 90° to each other. In general, the four groups each comprise n/2 or n balancing electrodes. The one or more balancing electrodes in each group are connected together to apply the same voltage. One of these four groups of balancing electrodes is aligned with, or straddling or adjacent to, the axis of the higher frequency mode $f_H$. For the example of a primary cos 2θ resonance excited along the primary axis, the four groups each comprise one or two balancing electrodes, i.e. four or eight electrodes in total.

In one or more examples, the second set of capacitive balancing electrodes comprises another four groups of balancing electrodes, the four groups spaced equiangularly around the annular resonator, i.e. at 90° to each other. In general, the four groups each comprise another n/2 or n balancing electrodes. The one or more balancing electrodes in each group are connected together to apply the same voltage. One of these four groups of balancing electrodes is aligned with, or straddling or adjacent to, the axis of the lower frequency mode $f_L$. For the example of a secondary cos 2θ resonance induced along the secondary axis, the four groups each comprise one or two balancing electrodes, i.e. another four or eight electrodes in total.

It will be appreciated that, for the example of a cos 2θ resonance, a gyroscope as disclosed herein potentially uses all sixteen capacitive balancing electrodes to apply static and dynamic electrostatic balancing forces to the annular resonator whereas, in prior art electrostatic balancing schemes, only eight of the sixteen balancing electrodes are used at any one time.

In one or more examples, the drive electrodes are controlled independently of the first and/or second set of balancing electrodes. In some examples the drive electrodes may be arranged to apply an analogue excitation voltage. In some examples the drive electrodes may be arranged to apply a digitally-controlled excitation voltage. The set of capacitive drive electrodes may be connected to a suitable digital control circuit. The set of capacitive drive electrodes can be arranged inside or outside the annular resonator.

In one or more examples, the gyroscope further comprises a set of capacitive sense electrodes arranged to measure the induced secondary cos nθ resonance, e.g. by sensing a voltage indicative of the secondary frequency $f_S$. This allows the gyroscope to determine the angular rate applied. In open loop operation, the capacitive sense electrodes may directly sense a voltage indicative of the secondary frequency $f_S$. In closed loop operation, the capacitive sense electrodes may provide a feedback signal to null the secondary cos nθ resonance. The drive electrodes may therefore comprise primary and secondary drive electrodes. Such closed loop operation is well known, for example as described in U.S. Pat. No. 6,282,958, the contents of which are hereby incorporated by reference. The set of capacitive sense electrodes can be arranged inside or outside the annular resonator.

In various examples, the vibrating structure gyroscope may comprise a digital control circuit connected to each set of capacitive electrodes. At least one digital control circuit may be connected to the first set of capacitive balancing electrodes and at least one other digital control circuit may be connected to the second set of capacitive balancing electrodes. The digital control circuits may be connected to independently control the first and second sets of capacitive balancing electrodes. Each digital control circuit may comprise a digital-to-analog converter (DAC) arranged to generate the balancing voltages, for example a 8-bit (or higher, e.g. 16-bit) DAC arranged to generate the digitally-controlled balancing voltages.

In one or more examples, first set of capacitive balancing electrodes is connected to a DAC, and the second set of capacitive balancing electrodes is connected to another independently controlled DAC. As disclosed above, the first set may comprise four groups and each group may comprise two independently controlled balancing electrodes. In these examples, the first set of capacitive balancing electrodes is connected to first and second DACs. As also disclosed above, the second set may comprise four groups and each group may comprise two independently controlled balancing electrodes. In these examples, the second set of capacitive balancing electrodes is connected to third and fourth DACs. In these examples there are then four independently controllable DACs which enable the voltages applied to each group of four to be adjusted.

It will be understood that the angular position of the capacitive drive electrodes can be used to define the primary axis. The angular position of each capacitive balancing electrode can be defined relative to the primary axis, e.g. moving angularly up to 360° or ±180° around the annular resonator. In some examples, the gyroscope comprises N (e.g. N=16) capacitive balancing electrodes at equally spaced angular positions around the annular resonator in groups of four balancing electrodes, the four groups spaced at 90° to each other. One or more of the balancing electrodes in these four groups of balancing electrodes provide the respective first and second sets of balancing electrodes. The N capacitive balancing electrodes can be arranged inside and/or outside the annular resonator. As there is a squared relationship between the balancing voltage and the frequency adjustment, it does not matter whether the applied voltage is positive or negative with reference to the annular resonator i.e. applied to a balancing electrode positioned inside or outside the annular resonator.

The N capacitive balancing electrodes may comprise N/2 or N/4 balancing electrodes equally spaced around the annular resonator to provide the first set of capacitive balancing electrodes useable to apply a static balancing voltage. The N capacitive balancing electrodes may comprise another N/2 or N/4 balancing electrodes equally spaced around the annular resonator to provide the second set of capacitive balancing electrodes useable to apply a fine balancing voltage. As is disclosed above, the first and second sets of capacitive balancing electrodes each comprises four groups of balancing electrodes, the four groups spaced equiangularly around the annular resonator, i.e. at 90° to each other. Each group may comprise one, two, or more balancing electrodes electrically connected together to apply the same voltage.

In some examples the set of capacitive drive electrodes is arranged to apply a voltage creating an electrostatic driving force to excite a primary cos 2θ resonance along the primary axis. In these examples the gyroscope may comprise 16 capacitive balancing electrodes at equally spaced angular positions around the annular resonator in four groups of four balancing electrodes, the four groups spaced at 90° to each other. In such examples the first set of capacitive balancing electrodes consists of one or two of the four balancing electrodes in each of the four groups and the second set of capacitive balancing electrodes consists of another one or two the four balancing electrodes in each of the four groups.

As will be understood by the discussion below, which of the N balancing electrodes belongs to the first set and which belongs to the second set is determined dynamically rather than being predetermined. Four groups of balancing electrodes amongst the N balancing electrodes can belong to either the first set or the second set at a given point in time. In some examples the gyroscope comprises a digital control system arranged to determine which four groups of capacitive balancing electrodes provides the first set and which four groups of capacitive balancing electrodes provides the second set at any given point in time. The first and second sets of balancing electrodes are mutually exclusive.

In some examples the angular position α of the higher frequency mode $f_H$ relative to the primary axis may not change and then which four groups of capacitive balancing electrodes provides the first set, and which four groups of capacitive balancing electrodes provides the second set, does not change.

In some examples, the capacitive balancing electrodes that are used to remove the frequency split may be determined at a given point in the lifetime of a given gyroscope. This determination may depend on the angular position α of the higher frequency mode $f_H$ relative to the primary axis. The angular position α is a variable that can change depending on how the ring is physically deforming as compared to the theoretical case of a deforming annulus. Accordingly the gyroscope may comprise a control system arranged to determine an angular position α of the higher frequency mode $f_H$ relative to the primary axis. The control system may determine which four groups amongst the N capacitive balancing electrodes provide the first set and the second set, respectively, at any given point in time, based on the angular position α. In some examples, the first set of capacitive balancing electrodes is selected such that at least one of the four groups of balancing electrodes is aligned with, or straddling or adjacent to, the axis of the higher frequency mode $f_H$. In some examples, the second set of capacitive balancing electrodes is selected such that at least one of the four groups of balancing electrodes is aligned with, or straddling or adjacent to, the axis of the lower frequency mode $f_L$.

In some examples the higher frequency mode $f_H$ is aligned with the primary axis such that α=0. In these examples the higher and lower frequency modes can be balanced, i.e. $f_H'$ matched to $f_L'$, by applying the static balancing voltage to a balancing electrode of the first set that is aligned with the primary axis. Alternatively, in these examples the higher and lower frequency modes can be balanced, i.e. $f_H'$ matched to $f_L'$, by applying the static balancing voltage to a pair of balancing electrodes of the first set that are straddling or adjacent to the primary axis, for example positioned at ±90°/4n, e.g. ±11.25° for a cos 2θ resonance, relative to the primary axis. This makes it possible to resolve the static electrostatic balancing force along the primary axis.

In some examples the higher frequency mode $f_H$ is not aligned with the primary axis such that α has a non-zero value. In such examples the higher frequency mode $f_H$ is at an angle α to the primary axis such that the primary frequency $f_P$ and the secondary frequency $f_S$ can be defined as:

$$f_P = \frac{f_H \cos 2\alpha + f_L \sin 2\alpha}{2};$$

and $$f_S = \frac{f_L \cos 2\alpha + f_H \sin 2\alpha}{2}.$$

In these examples the higher and lower frequency modes can be balanced, i.e. $f_H'$ matched to $f_L'$, by applying the static balancing voltage to a balancing electrode of the first set that is aligned with the angular position α relative to the primary axis. Alternatively, in these examples the higher and lower frequency modes can be balanced, i.e. $f_H'$ matched to $f_L'$, by applying the static balancing voltage to a pair of balancing electrodes of the first set that are straddling or adjacent to the angular position α, for example positioned at α±90°/4n e.g. ±11.25° for a cos 2θ resonance.

For the case of α=22.5° (2α=45°), the components sin 2α and cos 2α are equal, so both the primary axis vibration and secondary axis vibration appear to resonate at the same middle frequency (due to superposition of the two modes) even though there is a non-zero frequency split. In this case the higher and lower frequency modes can be balanced, i.e. $f_H'$ maintained at $f_L'$, by applying a fine balancing voltage to a balancing electrode of the second set that is positioned at 22.5±45° i.e. −22.5° or 67.5° from the primary axis for a cos 2θ resonance.

In some examples the higher frequency mode $f_H$ is aligned with the secondary axis such that α=45°. In these examples the higher and lower frequency modes can be balanced, i.e. $f_H'$ maintained at $f_L'$, by applying the static balancing voltage to a balancing electrode of the first set that is aligned with the secondary axis. Alternatively, in these examples the higher and lower frequency modes can be balanced, i.e. $f_H'$ maintained at $f_L'$, by applying the static balancing voltage to a pair of balancing electrodes of the first set that are straddling or adjacent to the secondary axis, for example positioned at ±90°/4n, e.g. ±11.25° for a cos 2θ resonance, relative to the secondary axis. This makes it possible to resolve the static electrostatic balancing force along the secondary axis.

DETAILED DESCRIPTION

One or more non-limiting examples will now be described, by way of example only, and with reference to the accompanying figures, in which:

FIG. 1 schematically shows the primary and secondary vibration axes for a Coriolis-type vibrating structure gyroscope;

FIGS. 3A to 3C show schematically how electrostatic frequency balancing is implemented in a vibrating structure gyroscope according to the prior art;

FIGS. 4A to 4D show schematically how electrostatic frequency balancing is implemented in a vibrating structure gyroscope according to an example of the present disclosure;

Figure 7:
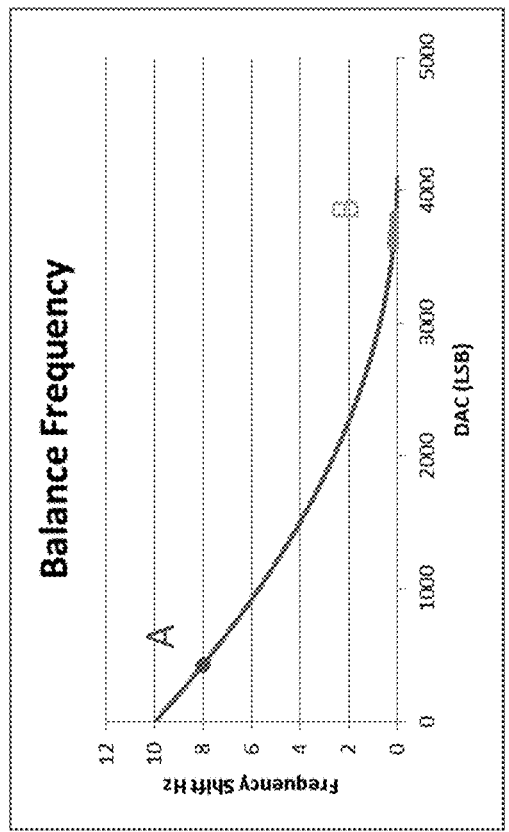
Figure 8:
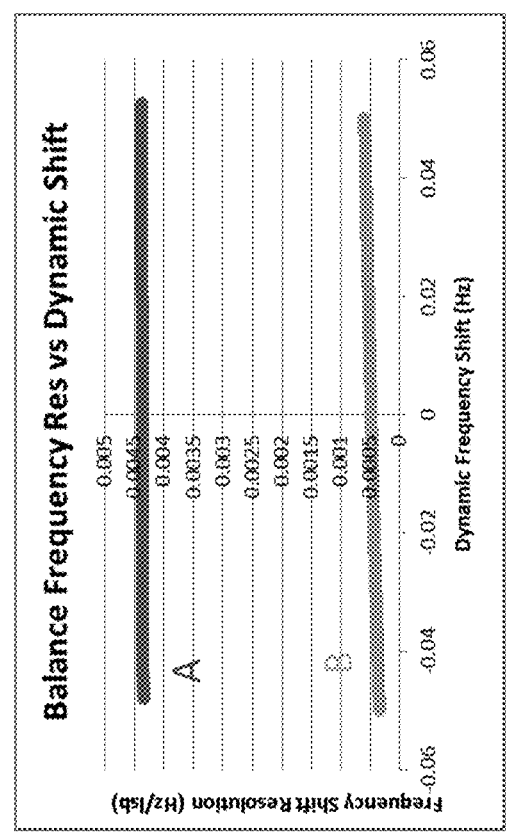

FIG. 5 provides a first exemplary arrangement of capacitive electrodes in a vibrating structure gyroscope where a pair of balancing electrodes is straddling the drive axis;

FIG. 6 provides a second exemplary arrangement of capacitive electrodes in a vibrating structure gyroscope where a balancing electrode is aligned with the drive axis;

FIG. 7 shows the balance frequency relationship for a digitally-controlled voltage; and FIG. 8 shows frequency shift resolution as a function of dynamic frequency shift.

Figure 1:
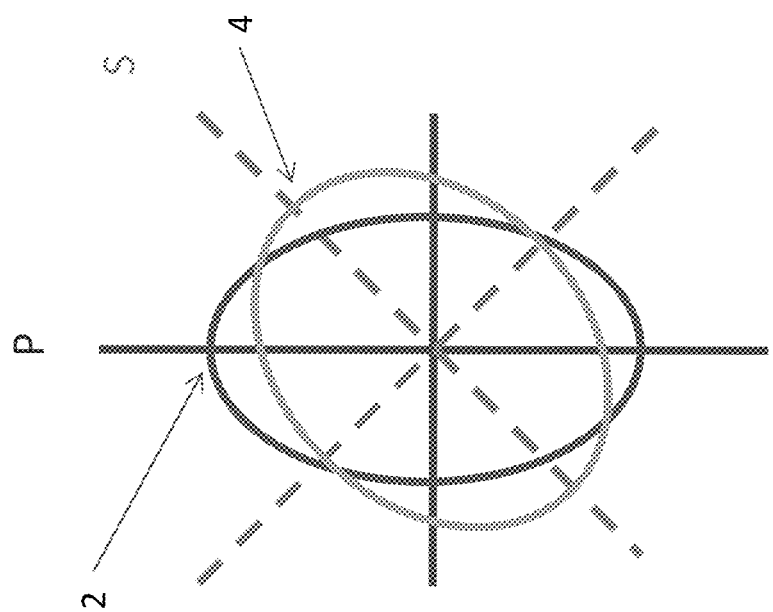

There is schematically shown in FIG. 1 an annular resonator having an excited primary cos 2θ resonance 2 along a primary axis P of and a Coriolis-induced secondary cos 2θ resonance 4 along a secondary axis S at 45° to the primary axis P. In the case of a geometrically perfect resonator, there is no frequency split and no balancing is required. In reality, the imperfect geometry of the annular resonator unfortunately results in the primary frequency $f_P$ of the primary cos 2θ resonance 2 being a superposition of a higher frequency mode $f_H$ and an orthogonal lower frequency mode $f_L$.

Figure 2:
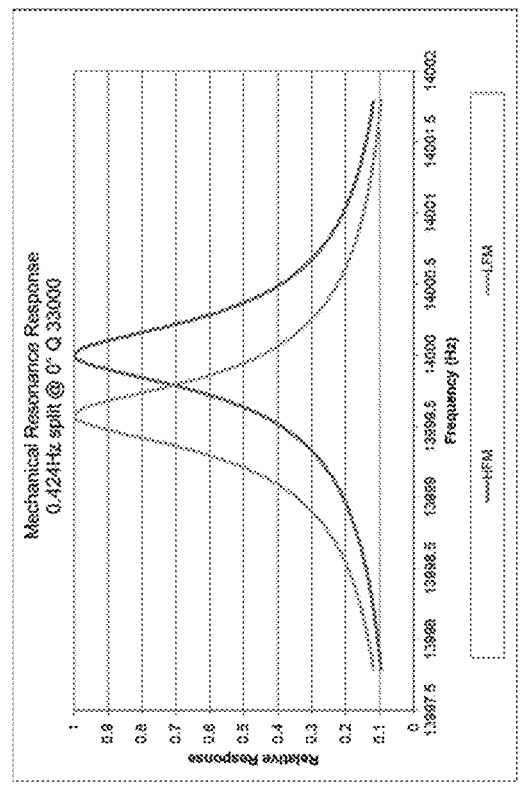
FIG. 2 shows the residual frequency split for a typical Coriolis-type vibrating structure gyroscope.

FIG. 2 shows one example of the reality for a silicon MEMS vibrating structure gyroscope having a driven primary cos 2θ resonance at a nominal frequency of 14 kHz. There is a 0.424 Hz split between the frequencies of the higher frequency mode (HFM) and lower frequency mode (LFM). In this example α=0°.

A vibrating structure gyroscope according to examples of the present disclosure may comprise a capacitive electrode arrangement as seen in FIG. 5 or FIG. 6. The annular resonator 6 is surrounded on the outside by a set of eight capacitive drive or sense electrodes 8. The annular resonator 6 is surrounded on the inside by a set of sixteen capacitive balancing electrodes 10 grouped in sets of four. In FIGS. 5 and 6 the capacitive balancing electrodes 10 have different angular positions relative to the primary axis P and secondary axis S but the control logic is the same. During operation, static or digitally-controlled balancing voltages can be applied independently to any group of four of the sixteen capacitive balancing electrodes 10. The principles of operation of such a gyroscope are known e.g. from U.S. Pat. No. 7,637,156, the contents of which are hereby incorporated by reference in their entirety.

In an electrostatic frequency balancing scheme according to the prior art, a residual frequency split $\Delta f = f_H - f_L$ is detected during operation (FIG. 3A) and then a static balancing −Δf is applied to lower $f_H$ to match $f_L$ (FIG. 3B). A first set of electrodes, namely a group of four of the sixteen electrodes seen in FIGS. 5 and 6, is used to apply the static balancing voltage. To account for deviations between $f_H$ and $f_L$ during the lifetime of the gyroscope, a dynamic balancing adjustment ±δf may be applied to the higher frequency mode $f_H$ to keep it matched with $f_L$ (FIG. 3C). However, when digitally controlling the voltage that is creating the electrostatic balancing forces to adjust the higher frequency mode $f_H$, the resolution of the balancing effect decreases with increasing voltage difference.

Figures 4C, 4D:
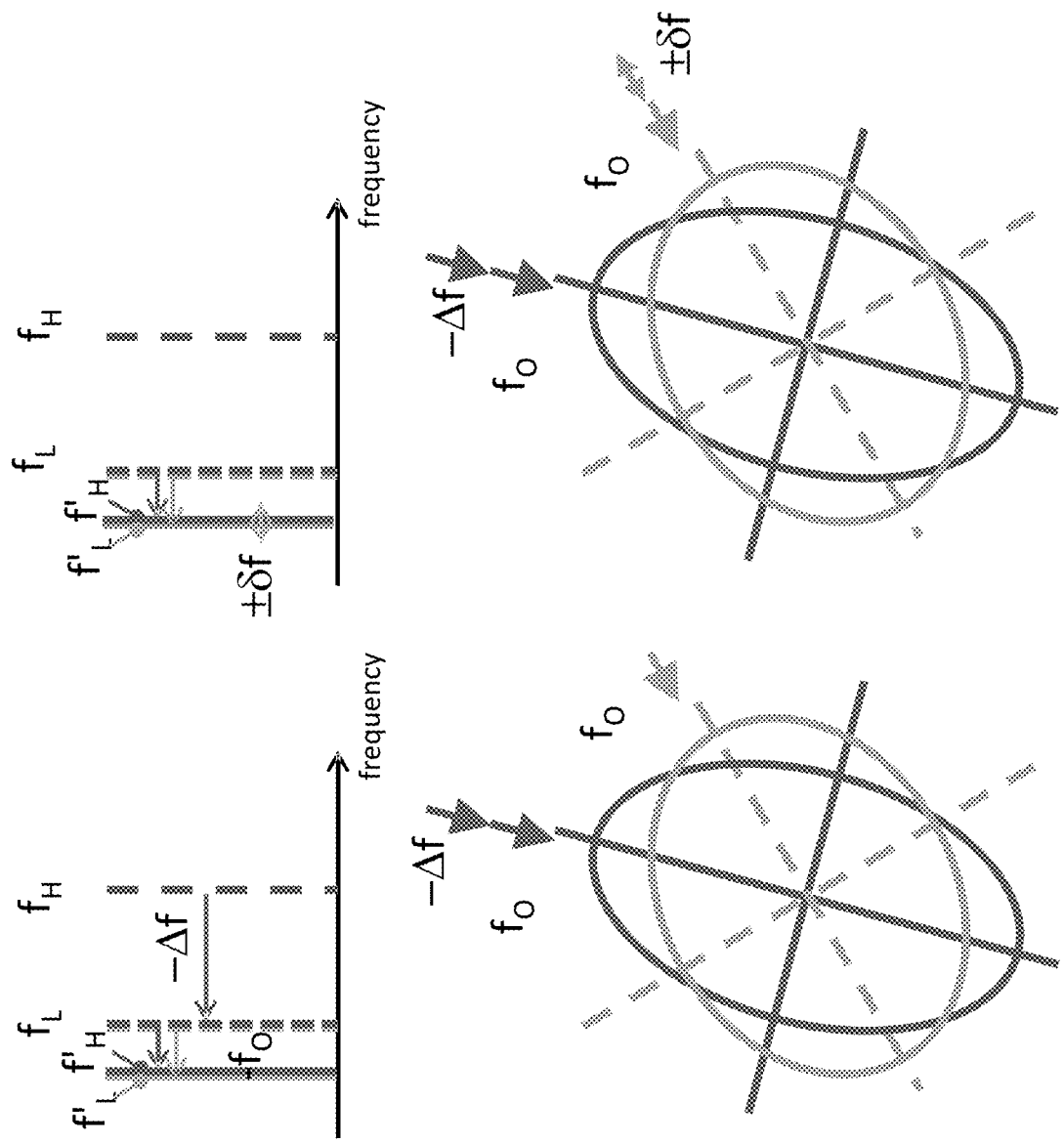

In an electrostatic frequency balancing scheme according to an example of this disclosure, as illustrated by FIGS. 4A to 4D, there is an additional offset balance applied before the dynamic balancing. The same as before, a residual frequency split $\Delta f = f_H - f_L$ is detected during operation (FIG. 4A) and then a static balancing $-\Delta f$ is applied to lower $f_H$ to match $f_L$ (FIG. 4B). A first set of electrodes, namely a group of four of the sixteen electrodes seen in FIGS. 5 and 6, is used to apply the static balancing voltage. In the new static balancing step of FIG. 4C, an additional frequency offset $f_O$ is applied to lower the frequency $f_H$ below the frequency $f_L$ to an offset frequency $f_H'$, i.e. $f_H' = f_H - (\Delta f + f_O)$, using the first set of electrodes. A second set of electrodes, namely another group of four of the sixteen electrodes seen in FIGS. 5 and 6, is used to apply the same frequency offset $f_O$ to the lower frequency mode $f_L$ and the frequency $f_L$ is also lowered by the same frequency offset $f_O$ to an offset frequency $f_L'$, i.e. $f_L' = f_L - f_O$. The frequency offset $f_O$ is small compared to the frequency split. When a dynamic balancing step is subsequently followed in FIG. 4D, the dynamic balancing provides a fine frequency adjustment $\pm \delta f$ that is applied to the offset frequency $f_L'$ to keep it maintained at $f_H'$. This fine frequency adjustment $\pm \delta f$ is applied by the same second set of electrodes. The fine frequency adjustment $\pm \delta f$ can have any value up to a maximum of the frequency offset $f_O$. Note that this fine dynamic balancing could be carried out in the analogue domain as a small signal approximation could be applied once the trim is fine enough. Such an electrostatic frequency balancing scheme uses at least two groups of four of the sixteen electrodes seen in FIGS. 5 and 6, i.e. at least eight balancing electrodes, and typically all sixteen of the balancing electrodes when each group of four comprises pairs of electrodes.

In the example seen in FIG. 5, there is a pair of balancing electrodes (ESB−11.25 and ESB11.25) straddling the primary axis P, i.e. each of the electrodes (ESB−11.25 and ESB11.25) is adjacent to the primary axis P. This is one pair in a group of four electrodes used to apply the same balancing voltage. Taking the case of $\alpha=0$ for a cos 2θ resonance, the static balancing voltage is applied to the pair of balancing electrodes of the first set at ±11.25° relative to the primary axis. The smaller static balancing voltages for the frequency offset $f_O$ and the fine balancing voltage for the fine frequency adjustment $\pm \delta f$ are both applied to another pair of balancing electrodes (ESB33.75 and ESB56.25) straddling the secondary axis S, i.e. each of the electrodes (ESB33.75 and ESB56.25) is adjacent to the secondary axis S. Again, this is one pair in a group of four electrodes providing the second set.

In the example seen in FIG. 6, there is a balancing electrode ESB0 aligned with the primary axis P. This is one in a group of four electrodes used to apply the same balancing voltage. Taking the case of $\alpha=0$ for a cos 2θ resonance, the static balancing voltage is applied to the balancing electrode of the first set aligned with the primary axis. The smaller static balancing voltages for the frequency offset $f_O$ and the fine balancing voltage for the fine frequency adjustment $\pm \delta f$ are both applied to another balancing electrode (ESB45) aligned with the secondary axis S. Again, this is one in a group of four electrodes providing the second set.

More generally, during operation of the gyroscope there is a digital control system that determines the mode position α, i.e. the angular position α of the higher frequency mode $f_H$ relative to the primary axis. Once the mode position α is known, the group of electrodes aligned with (or straddling or adjacent to) the higher frequency mode $f_H$ is used to provide the first set for static balancing. The second set of electrodes is therefore the other groups of electrodes which will be aligned with (or straddling or adjacent to) the lower frequency mode $f_L$. With reference to FIGS. 5 and 6, which of the sixteen balancing electrodes is designated as the first set, and which as the second set, is determined dynamically depending on the mode position α at a given point in the lifetime of the gyroscope.

EXAMPLE

In this illustrative example, a vibrating structure gyroscope has a primary cos 2θ resonance excited at a primary frequency $f_P$ of 14 kHz, with a residual frequency split $\Delta f = 8$ Hz. Following the electrostatic balancing scheme illustrated by FIGS. 4A to 4D, there is applied a static balance of 8 Hz (FIG. 4B), a small frequency offset $f_O = 0.1$ Hz (FIG. 4C), and a fine balancing voltage allows for a dynamic fine frequency balance adjustment, shown as $\pm \delta f$ (FIG. 4D). The fine frequency adjustment $\delta f$ can take a value up to $f_O$ i.e. $\delta f = \pm 0.1$ Hz or less, for example $\delta f = \pm 0.05$ Hz or $\delta f = \pm 0.01$ Hz.

For a DAC with a DAC value of n (LSB), the DAC output voltage $V(n) = kn$. The DAC can control the balancing voltage from 0V to $V_0$ as n changes from 0 to $2^N$, where N is the number of DAC bits, i.e. an 8-bit DAC has N=256. The balancing efficiency $\eta_B$ is related to the voltage difference $\Delta V = V_0 - V(n)$ by a squared relationship, i.e. $\eta_B$ depends on $\Delta V^2$. For the example of n=12 and $V_0=10$ V, we have $\eta_B = 10$ $\Delta V^2/\text{Hz}$.

$$\Delta V^2(n) = (V_0 - V(n))^2 = (V_0 - kn)^2 \quad (V^2)$$

$$\Delta f(n) = \frac{\Delta V^2(n)}{\eta_B} = \frac{1}{\eta_B}(V_0 - kn)^2 \quad (\text{Hz})$$

The sensitivity to a change in n i.e. the resolution is $$\text{abs}\left(\frac{d}{dn}\Delta f(n)\right) = \frac{2k}{\eta_B}(V_0 - kn) = 2k\sqrt{\frac{\Delta f(n)}{\eta_B}} \quad (\text{Hz/lsb})$$

This shows that the resolution is a function of n, so when n is small a finer resolution is achieved.

In FIG. 7, the point A (small n) on the graph shows a dynamic frequency balance adjustment $\delta f = \pm 0.05$ Hz about a static balance of 8 Hz, i.e. according to FIG. 3C, while the region B (large n) on the graph shows a dynamic frequency balance adjustment $\delta f = \pm 0.05$ Hz about a frequency offset $f_O$ of 0.1 Hz, i.e. according to FIG. 4D. FIG. 8 shows how the resultant frequency shift resolution is much finer for B as compared to A. The improvement in resolution is 8.81.

This Example illustrates that when a dynamic balance adjustment is implemented in combination with a relatively large static balance correction e.g. 8 Hz, the available resolution is degraded, which limits the overall gyroscope performance (FIG. 3). On the other hand, the additional frequency offset $f_O = 0.1$ Hz applied to both the higher and lower frequency modes, according to FIG. 4, ensures that the resolution of the dynamic frequency balance adjustment is maintained irrespective of the initial static balance. This provides an improvement across a range of different gyroscopes.

The invention claimed is:

1. A vibrating structure gyroscope comprising:
an annular resonator arranged to vibrate in a plane in response to electrostatic driving forces;
a set of capacitive drive electrodes arranged to apply a voltage creating an electrostatic driving force to excite a primary cos nθ resonance along a primary axis at a primary frequency $f_P$, such that Coriolis forces, resulting from an angular rate applied about an out-of-plane axis, induce a secondary cos nθ resonance along a secondary axis at a secondary frequency $f_S$,
wherein the geometry of the annular resonator results in the primary frequency $f_P$ being a superposition of a higher frequency mode $f_H$ and an orthogonal lower frequency mode $f_L$, having a frequency split $\Delta f$ defined as $\Delta f = f_H - f_L$;
a digitally-controlled first set of capacitive balancing electrodes arranged to apply a first static balancing voltage creating a static electrostatic balancing force to lower the frequency $f_H$ below the frequency $f_L$ by a small frequency offset $f_O$ to an offset frequency $f_H'$, where $f_H' = f_H - \Delta f - f_O$; and
a digitally-controlled second set of capacitive balancing electrodes arranged to apply a second static balancing voltage creating a small static electrostatic balancing force to lower the frequency $f_L$ by the same small frequency offset $f_O$ to an offset frequency $f_L'$, where $f_L' = f_L - f_O$;
wherein the second set of capacitive balancing electrodes is arranged to dynamically apply a fine balancing voltage creating a dynamic electrostatic balancing force providing a fine frequency adjustment $\pm\delta f$ that is applied to the offset frequency $f_L'$ so as to maintain $f_L'$ at $f_H'$ during operation.

2. The gyroscope of claim 1, wherein the small frequency offset satisfies $f_O < \Delta f$.

3. The gyroscope of claim 1, further comprising a digital control system arranged to control the second set of capacitive balancing electrodes independently of the first set of capacitive balancing electrodes.

4. The gyroscope of claim 1, further comprising a control system arranged to determine an angular position α of the higher frequency mode $f_H$ relative to the primary axis.

5. The gyroscope of claim 4, further comprising N capacitive balancing electrodes, wherein the digital control system determines which four groups of balancing electrodes amongst the N capacitive balancing electrodes provide the first set and the second set, respectively, at any given point in time, based on the angular position α.

6. The gyroscope of claim 5, wherein the first set of capacitive balancing electrodes is selected such that at least one of the four groups of balancing electrodes is aligned with, or straddling or adjacent to, the axis of the higher frequency mode $f_H$.

7. The gyroscope of claim 5, wherein the second set of capacitive balancing electrodes is selected such that at least one of the four groups of balancing electrodes is aligned with, or straddling or adjacent to, the axis of the lower frequency mode $f_L$.

8. The gyroscope of claim 1, comprising an analogue signal control circuit connected to the second set of digitally-controlled capacitive balancing electrodes and arranged to dynamically control the second set of capacitive balancing to provide the fine frequency adjustment $\pm\delta f$.

9. The gyroscope of claim 1, comprising a digital control circuit connected to the second set of digitally-controlled capacitive balancing electrodes, wherein the digital control circuit comprises a digital-to-analog converter (DAC) arranged to generate a digitally-controlled voltage creating the small frequency offset $f_O$.

10. The gyroscope of claim 9, wherein the digital control circuit connected to the second set of digitally-controlled capacitive balancing electrodes is arranged to dynamically control the second set of capacitive balancing electrodes to provide the fine frequency adjustment $\pm\delta f$.

11. The gyroscope of claim 1, further comprising a digital control circuit connected to the first set of digitally-controlled capacitive balancing electrodes, wherein the digital control circuit comprises a digital-to-analog converter (DAC) arranged to generate a digitally-controlled voltage creating the first static balancing voltage.

12. The gyroscope of claim 1, further comprising a set of capacitive sense electrodes arranged to measure an induced secondary cos nθ resonance.

13. The gyroscope of claim 1, wherein the set of capacitive drive electrodes is arranged to apply a voltage creating an electrostatic driving force to excite a primary cos 2θ resonance along the primary axis.

14. The gyroscope of claim 13, comprising 16 capacitive balancing electrodes at equally spaced angular positions around the annular resonator in four groups of four balancing electrodes, the four groups spaced at 90° to each other.

15. The gyroscope of claim 14, wherein the first set of capacitive balancing electrodes consists of one or two of the four balancing electrodes in each of the four groups and the second set of capacitive balancing electrodes consists of another one or two of the four balancing electrodes in each of the four groups.

* * * * *